United States Patent [19]

Duescher

[11] 3,972,760

[45] Aug. 3, 1976

[54] METHOD OF MAKING A FISHING LURE COMPONENT

[75] Inventor: Margie F. Duescher, St. Paul, Minn.

[73] Assignee: FisHair Incorporated, St. Paul, Minn.

[22] Filed: Sept. 19, 1974

[21] Appl. No.: 507,402

Related U.S. Application Data

[62] Division of Ser. No. 194,933, Nov. 2, 1971, Pat. No. 3,864,864.

[52] U.S. Cl.................................. 156/181; 156/251; 156/296; 428/296
[51] Int. Cl.².......................................... D04H 3/14
[58] Field of Search............ 156/180, 306, 583, 181, 156/62.6, 167, 166, 72, 251, 88, 296, 290, 515; 28/1 CF, 55.5; 43/42.25, 42.28, 42.53; 264/168, 243, 258, 257; 300/21; 428/88, 192, 295, 115, 296

[56] References Cited
UNITED STATES PATENTS

| | | | |
|---|---|---|---|
| 1,640,599 | 8/1927 | Conn | 156/180 |
| 2,018,622 | 10/1935 | Davenport | 156/180 |
| 2,563,825 | 8/1951 | Ebert | 43/42.53 |
| 2,672,640 | 3/1954 | Peterson et al. | 264/243 |
| 3,017,307 | 1/1962 | Halliburton | 43/42.53 |
| 3,033,257 | 5/1962 | Webber | 156/251 |
| 3,035,381 | 5/1962 | Hosso | 156/251 |
| 3,371,000 | 2/1968 | Davenport et al. | 156/180 |
| 3,607,567 | 9/1971 | Fairbanks | 156/166 |

*Primary Examiner*—Douglas J. Drummond
*Assistant Examiner*—Michael W. Ball
*Attorney, Agent, or Firm*—Hill, Gross, Simpson, Van Santen, Steadman, Chiara & Simpson

[57] ABSTRACT

Heat-fusible hair-like fibers, disposed as a tow in a flat manner, are provided a narrow common bond by being thermally fused together transversely to the direction of the tow, such fused bonds being provided at increments along the length of the tow to sever such increments from the tow, the bonds being split lengthwise of the bonds and the increments being mechanically severed intermediate the bonds to provide flat bundles of hair-like fibers whose strands lie in a generally common direction and which strands have a narrow common bond at only one end. The bond is brittle and the user is readily enabled to separate a portion of the fibers as a unit from the article for use, for instance as a fishing lure component.

3 Claims, 3 Drawing Figures

U.S. Patent  Aug. 3, 1976  3,972,760
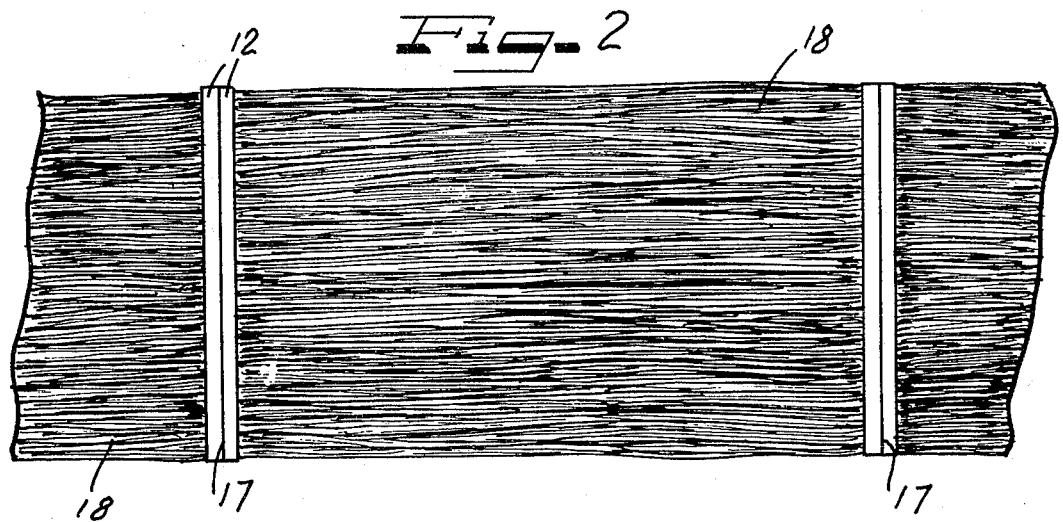
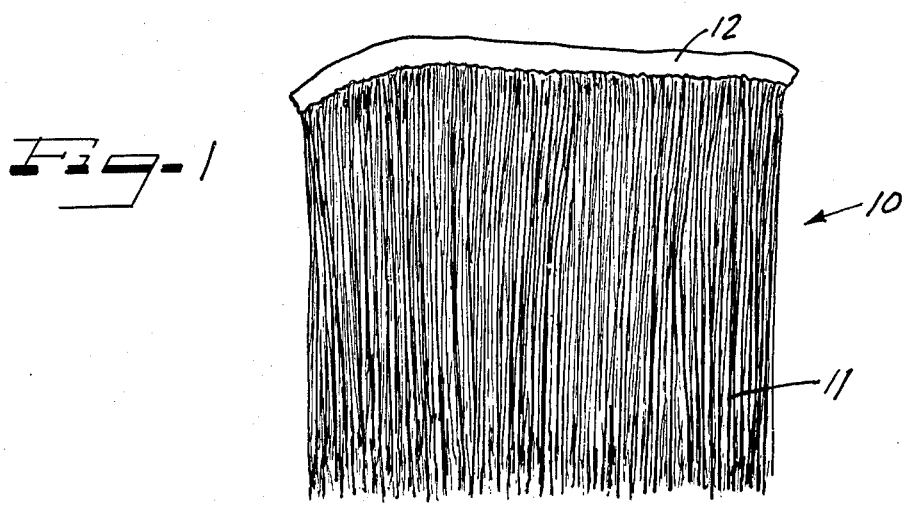
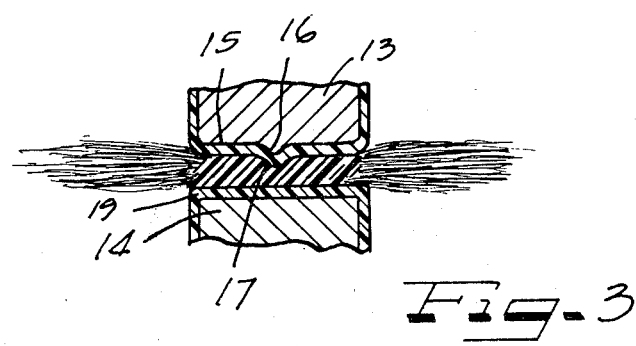

METHOD OF MAKING A FISHING LURE COMPONENT

RELATED APPLICATION

This is a division of application Ser. No. 194,933, filed Nov. 2, 1971, now U.S. Pat. No. 3,864,864.

BACKGROUND

This invention pertains to a method for making an article of commerce, and more specifically for making a component for use in making a fishing lure.

PRIOR ART

It has been known heretofore in the making of fishing lures, to utilize hair around a barbed hook. Such hair has either been natural or synthetic and must be tightly secured to the shank of the hook near the eyelet thereof. It has thus been known to begin with a tow of hair or synthetic fiber in bulk, to cut the fiber to length, to separate from the tow such quantity of hair as is needed for particular lure, and after the hair has been fastened to the lure, to trim excess hair therefrom as by a scissors, and for safety, a cement was frequently thereafter affixed.

For economic reasons, since natural hair is expensive and its supply is decreasing, it has been preferable to utilize synthetic fiber, but it has been observed that synthetic fibers tangle easily, are hard to untangle, tend to be clingy due to static electricity, are slippery and hard to grasp firmly, and are often hard to cut by scissors except when very few strands are used.

SUMMARY OF THE INVENTION

The present invention is directed to a method for making an inexpensive article of commerce, which may be used as a fishing lure component by a fishing lure manufacturer wherein the component comprises a substantially flat bundle of hair, preferably a snythetic hair-like fiber that has the physical properties of "Dynel", the strands of which bundle lie in a generally common direction, and the strands having a narrow common bond at only one end thereof provided by a thermal fusion of the ends of the strands of hair and the bond being brittle. The bond is formed by a heated bar that simultaneously forms the bonds end-for-end of two such articles, the heat being applied through a coating of material having the physical properties of tetrafluoroethylene.

Accordingly, it is an object of the present invention to provide a method for making an article of commerce.

A further object of the present invention is to provide a method for making a fishing lure component.

A still further object of the present invention is to provide a method for joining bundle of hair-like fiber which will store well without tangling.

Another object of the present invention is to provide a method for making a bundle of hair-like fiber wherein portions can be readily selected as a unit from a larger quantity of such fiber, the unit being of selected size.

Many other advantages, features and additional objects of the present invention will become manifest by those versed in the art upon making reference to the detailed description and the accompanying sheet of drawings in which a preferred embodiment incorporating the principles of the present invention is shown by way of illustrative example.

ON THE DRAWINGS

FIG. 1 is an elevational view of an article, such as a fishing lure component, provided in accordance with the principles of the present invention; and FIGS. 2 and 3 illustrate the method of making the article of FIG. 1.

AS SHOWN ON THE DRAWINGS

The principles of the present invention are particularly useful when embodied in an article such as shown in FIG. 1, generally indicated by the numeral 10, and here constituting a fishing lure component. The article 10 comprises a substantially flat bundle of hair 11 whose individual strands lie in a generally common direction, the strands having a narrow common bond 12 at only one end thereof. In a preferred embodiment, the hair 11 is thermally fusible and to that end constitutes synthetic hair-like fiber that has the physical post-fusion brittleness property of "Dynel", "Dynel" being a trademark owned by Union Carbide Company and used to identify modacrylic fiber formed as a copolymer from vinyl chloride and acrylonitrile. It is believed the "EURLA" fiber is equivalent, "EURLA" being a trademark owned by Monsanto Chemical Company. Nylon is another substitute material.

The bonds 12 are formed in adjacent pairs by taking a substantial length or tow of heat-fusible hair-like fibers and disposing them in a substantially flat manner. Then the tow is advanced by an increment that represents twice the length of the hair or fibers 11 desired for one article 10. In a preferred method, a heated bar 13 that spans the tow then pinches the tow against a heated backup member 14. The bar 13 and member 14 have a temperature sufficient to cause the individual hair-like fibers to fuse together into a common but weak mass, and to prevent such mass from sticking to the bar 13 and member 14, the heat preferably is applied through layers of tetrafluoroethylene 15,19 carried by the bar 13 and member 14. The layers 15, 19 have the property of non-sticking with respect to the hair 11 and the property of being thermally stable in response to heat from the bar 13. Preferably the bar 13 has a central ridge 16 running along its length to form a line of reduced thickness 17 that extends centrally along the fused area, and while the fusing takes place, shrinkage occurs at the line 17 so that two spaced bonds 12 form whereby one increment of hair 18 is automatically severed from the tow by said material shrinkage, the bonds being then permitted to cool. On cooling, the bond 12 tends to take a rather irregular shape such as shown in FIG. 1, which is not of any consequence and which at times can even be used to provide an unevenness in the length of the hair 11 if such is desired. The increment 18 of hair between two of the bonds 12 is thereafter centrally cut by any mechanical means that does not cause thermal fusion to provide two articles such as shown in FIG. 1.

After the bond 12 has been permitted to cool to room temperature, it becomes very brittle but has sufficient strength to enable ready handling, such as for storage, and such as for further processing of the free ends, not a part of this invention. Yet, the bond can be easily fractured transversely to the length of the bond, namely parallel to the direction in which the hair 11 extends, so as to enable the user to readily select the exact quantity of hair 11 that he wishes to utilize in the lure being manufactured.

The resulting bundles or articles 10 store well without tangling of the hair, and the problems enumerated above under "Prior Art" are eliminated for the lure manufacturer. Fly tyers find it easier to work with the bundles or articles 10 than to work with natural hair.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A method of making an article of commerce, such as a fishing lure component, comprising:
   a. arranging a tow of heat-fusible hair-like fiber in a substantially flat planar manner;
   b. by means of a heated bar applied transversely to one side of the tow, simultaneously clamping and fusing only the hairs of the tow of fiber together to form a bond comprising narrow planar common bond portions extending transversely to the tow and lying in the plane of the tow, said fiber being of such material as to render said bond portions brittle when cooled, said bond portions being formed in said tow at longitudinally spaced intervals, the bar forming a transverse line of reduced thickness between said common bond portions across the tow whereby each transverse bond splits lengthwise of the bond to separate successive increments of said tow bonded at both ends; and
   c. thereafter, mechanically cutting each such increment in two transversely to the length of the hairs between two bond portions to form articles having hairs bonded together at only one end.

2. A method according to claim 1 wherein the bar, through which the heat is applied to the hairs, has a non-sticking and thermal resistant coating.

3. A method according to claim 1 in which the fiber used produces such brittleness in the cooled bond that the bond may be fractured in the direction of the length of the hairs by snapping it apart between the fingers, whereby each of the articles can be broken into smaller articles.

* * * * *